United States Patent [19]

Garratt et al.

[11] Patent Number: 4,646,178

[45] Date of Patent: Feb. 24, 1987

[54] TRANSPORT FOR OPEN OR CLOSED FLAP DISKETTES

[75] Inventors: Ford Garratt; Steven Thompson, both of Scotts Valley, Calif.

[73] Assignee: Mountain Computer Incorporated, Scotts Valley, Calif.

[21] Appl. No.: 703,034

[22] Filed: Feb. 19, 1985

[51] Int. Cl.⁴ .............................................. G11B 5/012
[52] U.S. Cl. ........................................ 360/98; 360/137
[58] Field of Search .................................. 360/97–99, 360/137, 92

[56] References Cited

U.S. PATENT DOCUMENTS

| | | | |
|---|---|---|---|
| 4,173,427 | 11/1979 | Beuch et al. | 360/98 X |
| 4,195,321 | 3/1980 | Chelin et al. | 360/98 |
| 4,226,570 | 10/1980 | Holecek et al. | 360/98 X |
| 4,479,210 | 10/1984 | Nakayama | 369/194 |
| 4,504,878 | 3/1985 | Gutmann | 360/98 |

*Primary Examiner*—John H. Wolff

[57] ABSTRACT

A transport mechanism for open or closed flap diskettes is provided wherein the diskettes are singulated and withdrawn from the bottom of a stack of diskettes disposed in a hopper, transported to a work station where the diskette is duplicated and tested, then withdrawn from the work station and deposited in one of several bins depending upon the results of testing.

The diskettes are supported in a hopper upon first and second support surfaces, the first being at the front of the hopper and slightly above the second. The lowermost diskette is moved rearwardly from beneath the stack until its front edge is deposited onto a third support surface below the first support surface, then engaged by a clamp and advanced beneath the first support surface to the work station.

6 Claims, 9 Drawing Figures

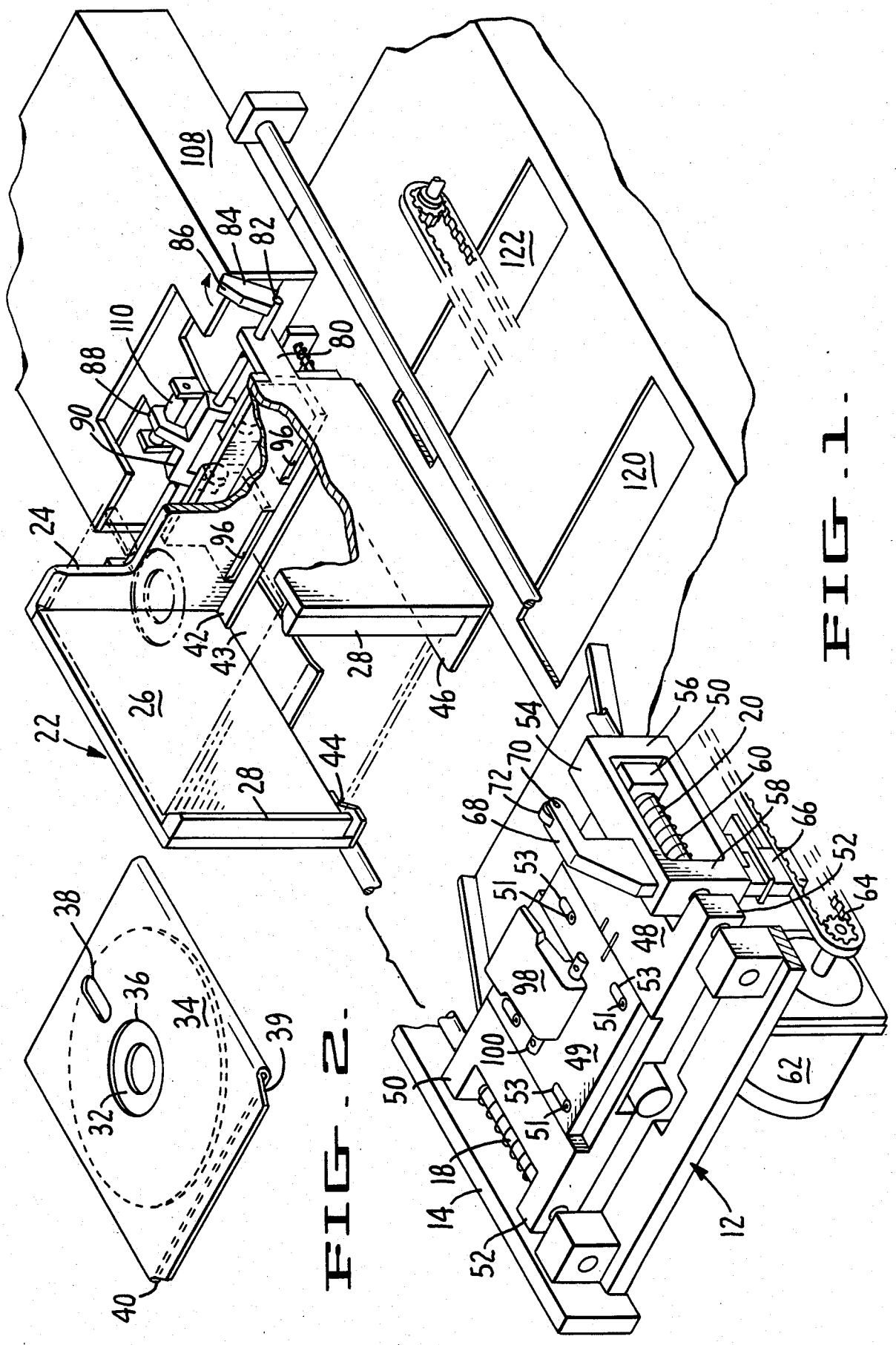

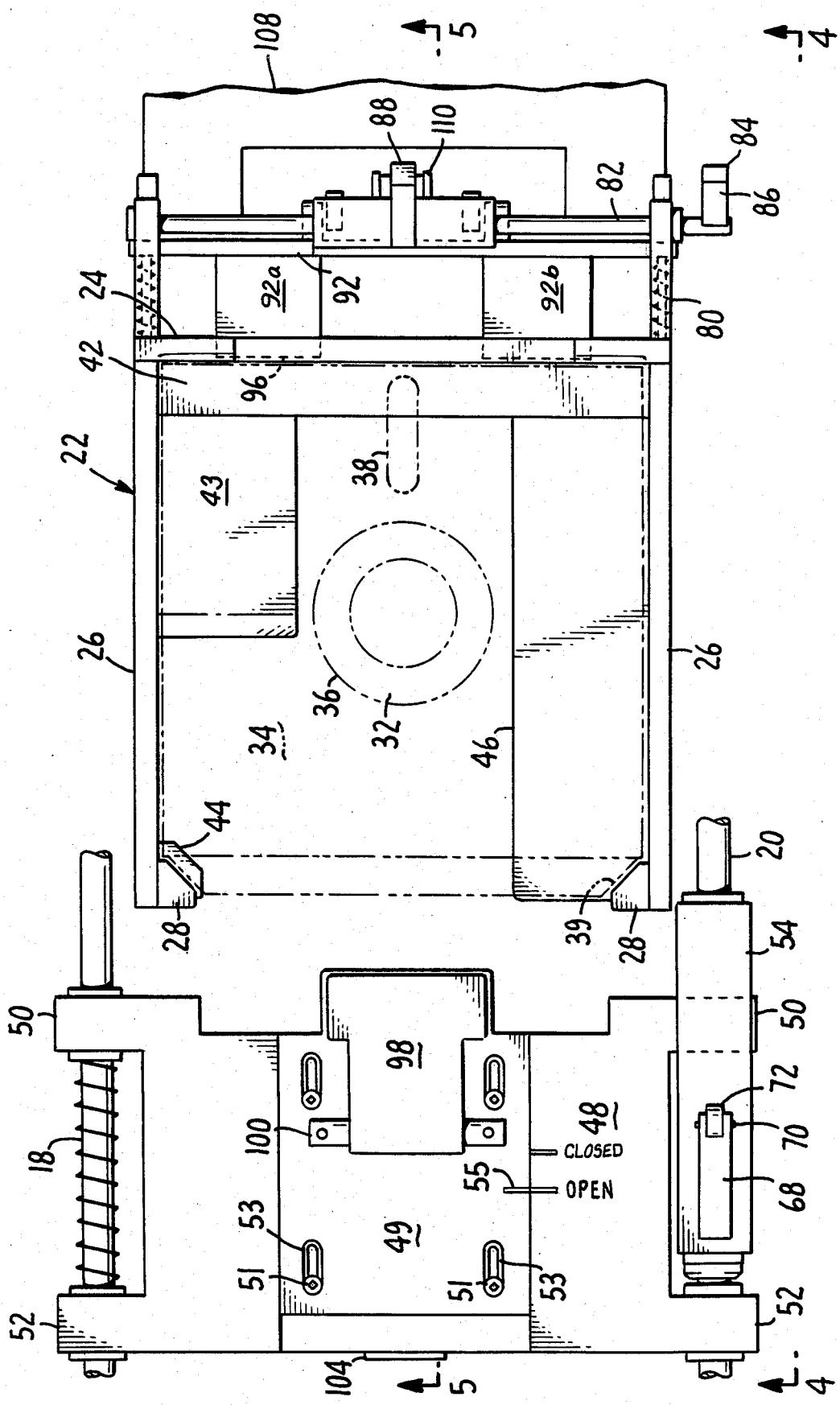

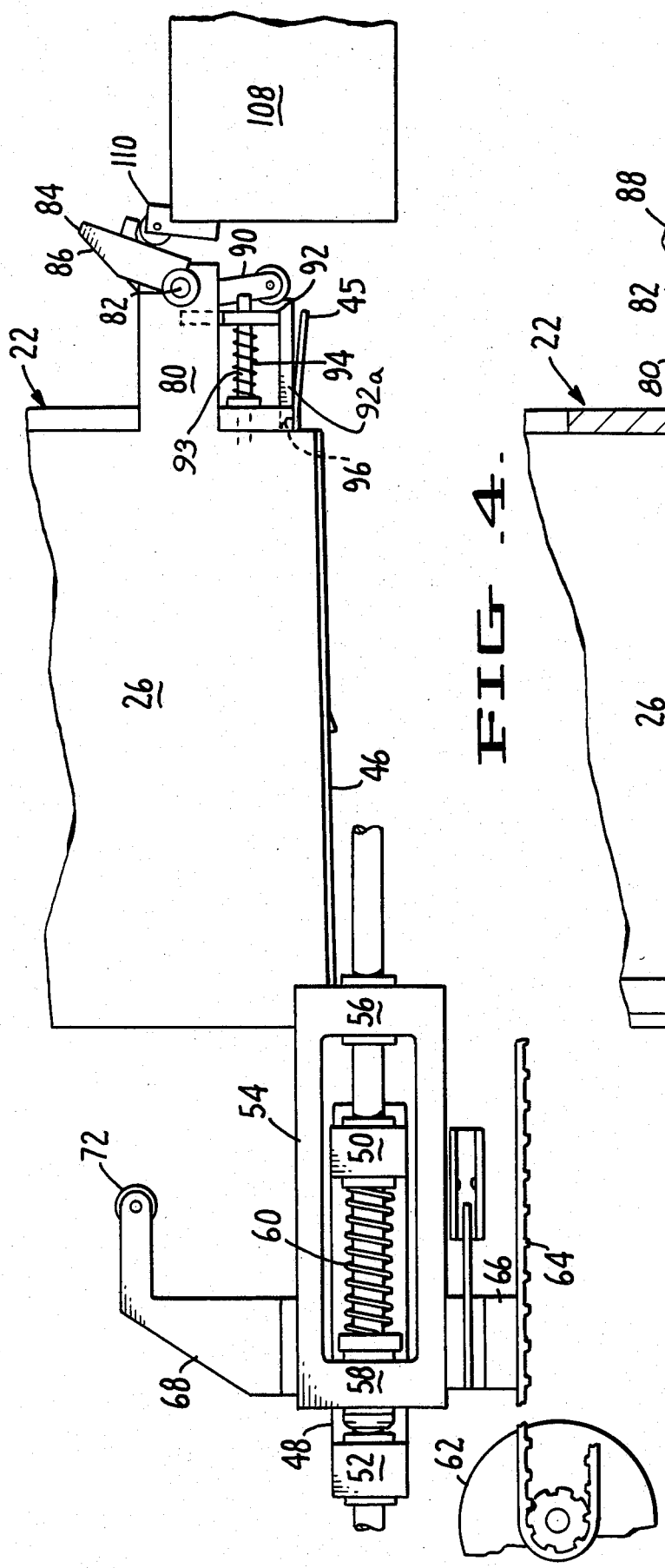
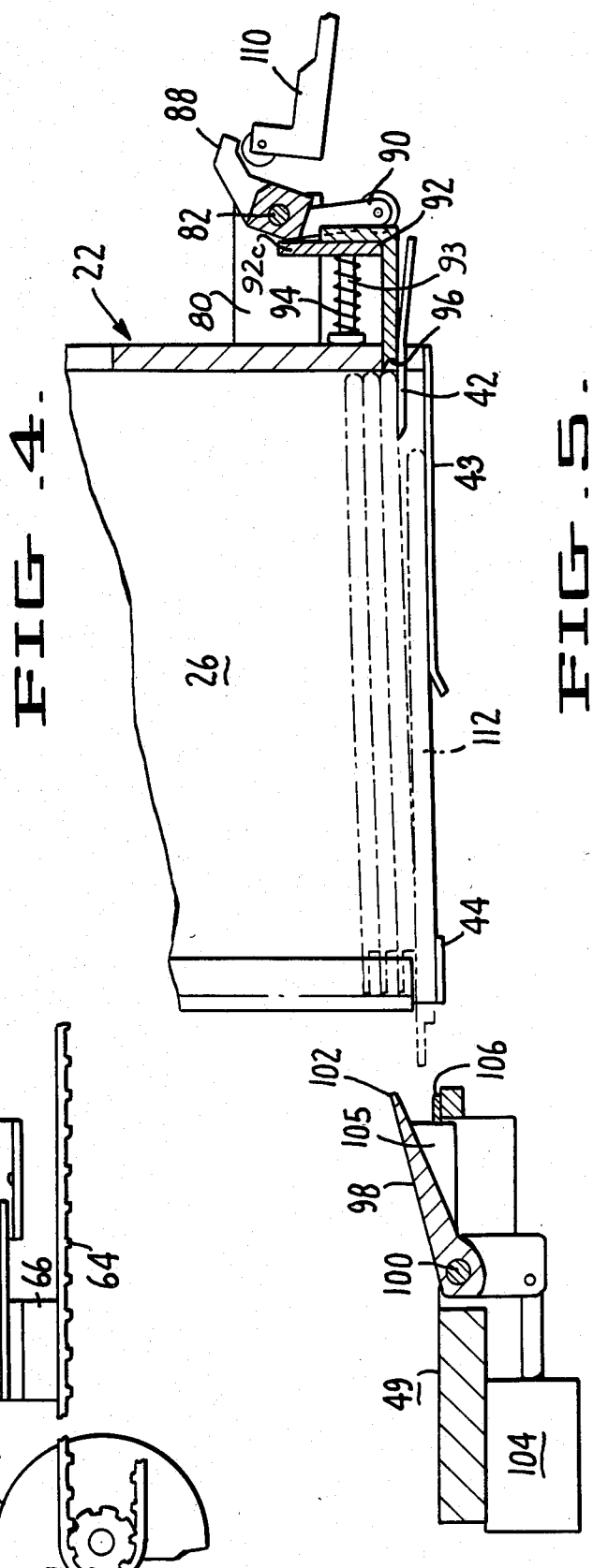

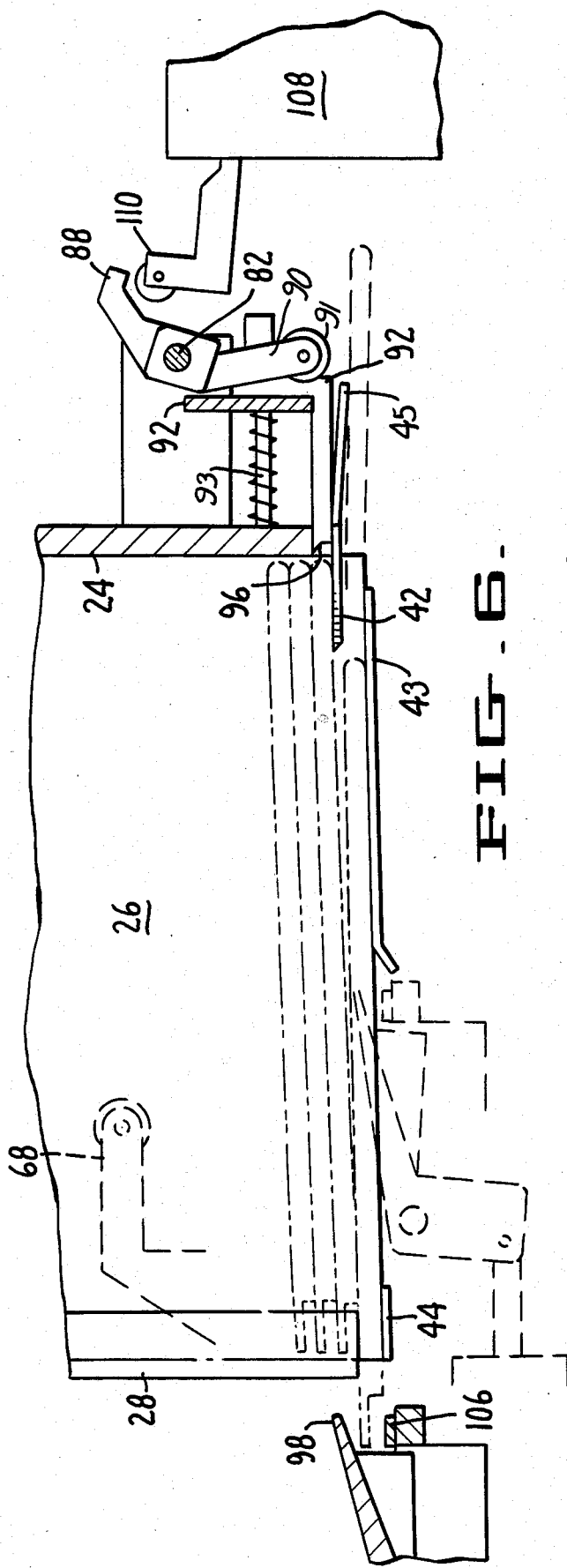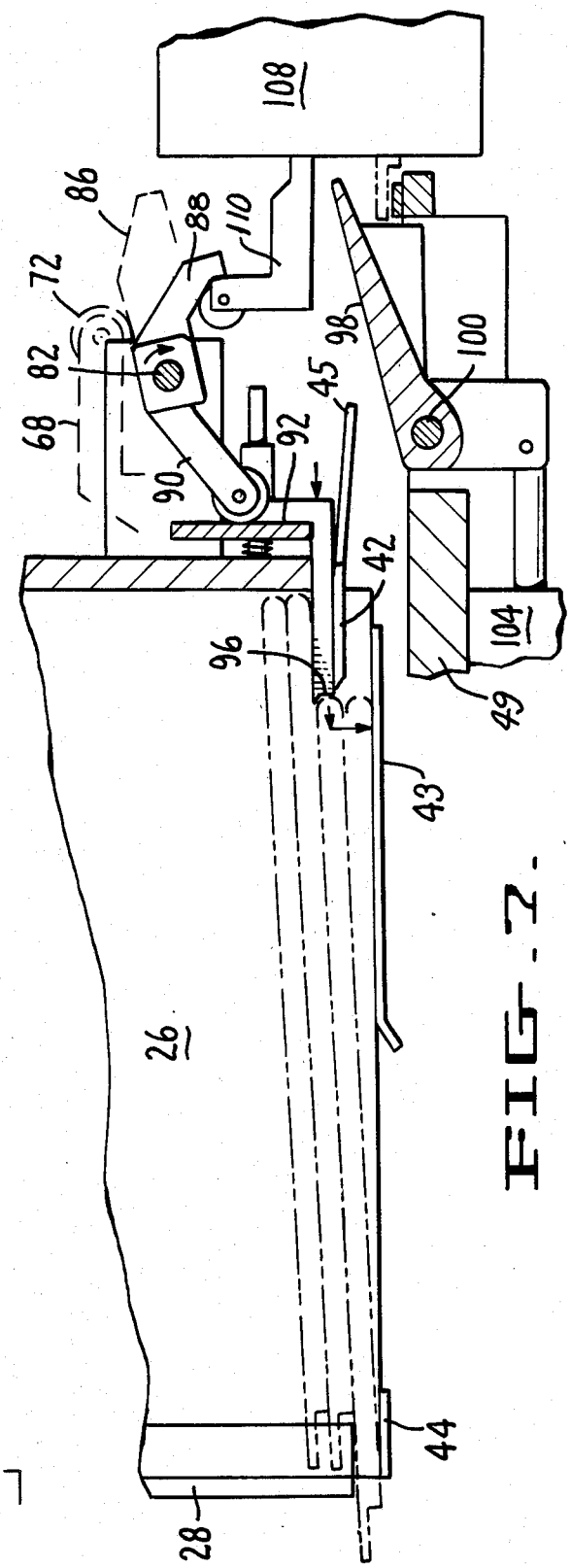

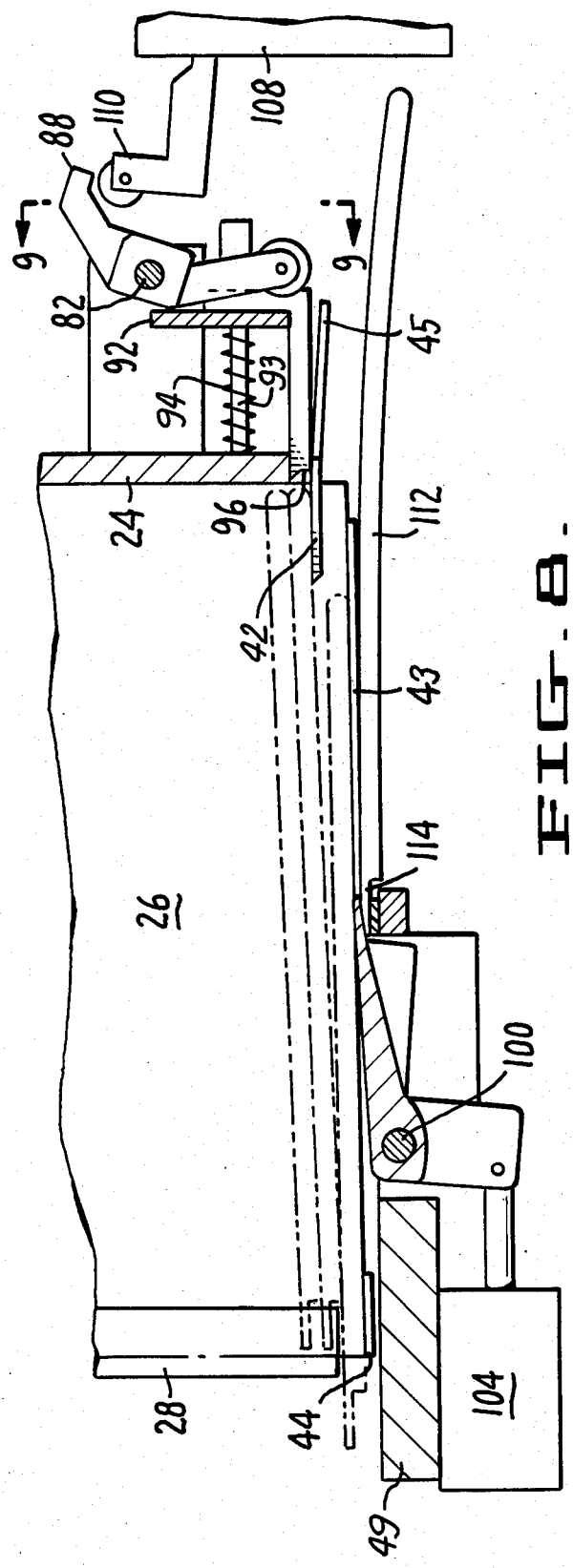
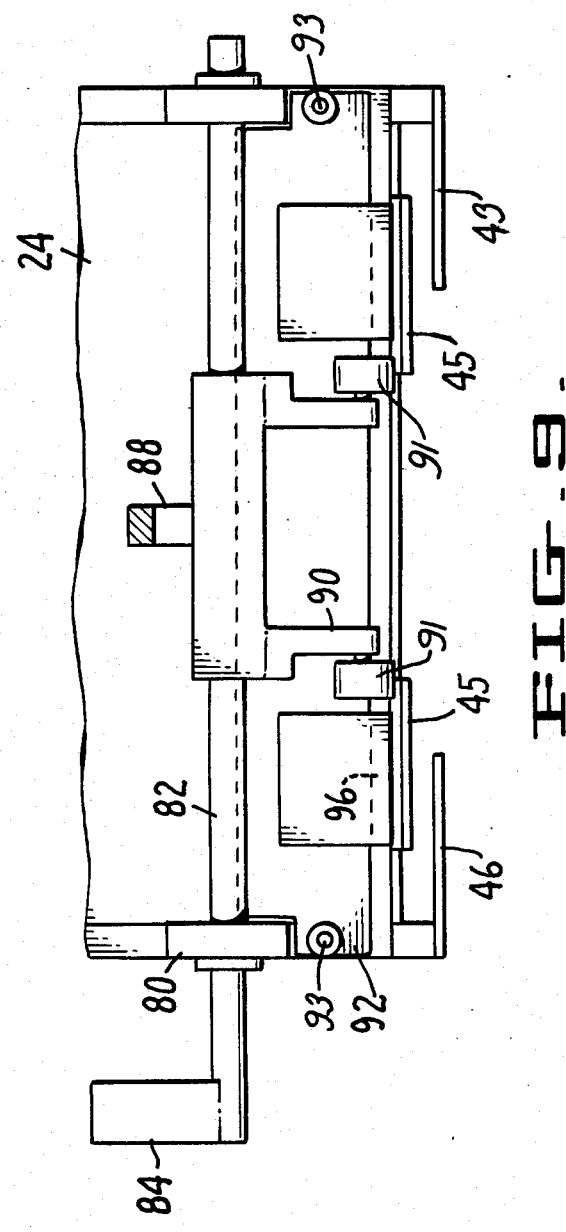
FIG. 8.
FIG. 9.

TRANSPORT FOR OPEN OR CLOSED FLAP DISKETTES

BACKGROUND OF THE INVENTION

Floppy disks are well-known to those skilled in the art. The disks consist of a plastic substrate coated with magnetic particles and encased in an envelope which has openings for engaging drive and read-write mechanism. Normally, such disks are removed from a supply of disks and passed to a mechanism where information is duplicated onto the disk. The disks is then checked for errors and returned to one of a plurality of bins depending on whether the disk is good or bad.

In the past, it has been the practice to handle such disks in sealed envelopes. If the disk is bad, the entire envelope and disk must be discarded. Surprisingly, the envelope is actually more expensive than the magnetic disk within the envelope.

SUMMARY OF THE INVENTION

The present invention permits one to handle disks contained in an envelope with an unsealed protruding flap as well as sealed disks. After a disk in an unsealed envelope has been tested and found defective, the magnetic disk is merely removed from the envelope and a new disk inserted therein. Thus, in the case of those disks which are defective, it is not necessary to discard the complete unit but the relative more costly envelope can be recovered for reuse with a new disk.

In the preferred embodiment of the invention, means is provided so that the transport mechanism will handle both sealed and unsealed (open) envelopes.

The device illustrated is for a standard 5¼" floppy diskette but, of course, it is easily adapted for other sizes.

The mechanical device of the present invention is controlled by a host computer which also supplies the data to be duplicated or otherwise processed so that it is not necessary for the user to duplicate existing equipment.

The diskette transport of the present invention operates without supervision so that a large number of disks can be duplicated, checked and placed in an appropriate bin without the attention of an operator.

Summing up the above, the present invention permits one to transport and perform operations on disks or diskettes with open flap envelopes and to recover and recycle the envelope should the disk proper prove defective. An adjustment feature enables one to handle closed flap diskettes as well.

Other objects and advantages of the invention will be brought out in the more detailed description that follows.

BRIEF DESCRIPTION OF THE DRAWINGS

FIG. 1 is a perspective view, partly in section, of a preferred embodiment of the invention in a transport mechanism for diskettes;

FIG. 2 is a perspective view of an open flap diskette of the type handled by the mechanism of the present invention;

FIG. 3 is a partial plan view of the mechanism shown in FIG. 1;

FIG. 4 is a side view of the mechanism taken on the line 4—4 of FIG. 3;

FIG. 5 is a section of the mechanism taken on line 5—5 of FIG. 3;

FIG. 6 is a side section, similar to FIG. 5, showing alternate positions of the parts in solid lines and in phantom;

FIG. 7 is a side section similar to FIG. 6 showing a view of the parts as a diskette is being inserted into a duplicating-testing machine;

FIG. 8 is a side section showing a view of the parts as a diskette is withdrawn from the machine; and FIG. 9 is an end view taken on line 9—9 of FIG. 8.

DESCRIPTION OF THE PREFERRED EMBODIMENT

Referring now to the drawings, the apparatus of the present invention includes a frame member 12 having a far side rail 14 and a similar rail on the near side, not shown. Mounted on the frame, utilizing suitable support members, are round guide rails 18 and 20. Mounted near the center of the device is a hopper 22 having an open top with a front wall 24, side walls 26 and a pair of spaced apart rear walls 28 which form a large opening therebetween. Such an opening provides access for placing or removing a stack of diskettes in and from the hopper.

The diskettes are well-known to those skilled in the art, although the apparatus for handling open flap diskettes, as shown, is heretofore unknown. Each diskette consists of a flat plastic disk 32 having a coating of magnetic particles thereon and encased in an envelope 34 having a central opening 36 (that allows the disk to be rotated) and a rear-write slot 38. An open flap diskette, which may be handled with the mechanism of the present invention, also has a flap 39. After a disk has been tested and found good, flap 39 is, of course, sealed. A closed diskette, which can also be handled, looks the same as FIG. 2 except that the flap is folded over, as at 40, and sealed.

The bottom of hopper 22 is essentially open and a stack of diskettes is normally supported within the hopper on a front plate 42 (or first support means) and rear corner plate 44 and the rear portion of a side plate 46 (as second support means). A front support plate 43 (a third support means) is also provided for supporting the lowermost diskette as it is separated from the stack (FIG. 7) and moved from beneath the hopper (FIG. 8). Plates 43, 44, and 46 are all located at essentially the same elevation beneath the hopper, each being at a position below the supporting surface of plate 42. Plates 44 and 46 are set below rear containment walls 28 to define a rear slot for receiving the edge of a diskette therethrough.

Support plate 42 is set below the front containment wall 24 to define a front slot and is integrally formed with a pair of deflecting plates 45 which extend forwardly and downwardly from front wall 24. The purpose of the deflecting plates is to deflect and direct the leading edge of the diskette as it is being pushed beneath support plate 42.

A carriage 48 is formed with a pair of forward arms 50, and a pair of rear arms 52, which mount the carriage for sliding reciprocal movement along rails 18 and 20. Carriage 48 supports a plate 49, the position of the plate being adjustable in the direction of carriage travel. For this purpose, plate 49 is secured to the carriage by means of screws 51 that extend through slots 53 formed in the plate, the length of the slots determining the limits of plate adjustment. Screws 51 are loosened for adjusting the position of plate 49 and tightened to hold the plate in the desired or selected position. Positioned as shown, plate 49 and a supported clamping mechanism including disk clamp 98 are located for engaging and transporting open flap diskettes. Moving plate 49 closed to hopper 22 positions the disk clamp 98 for engaging and transporting closed flap diskettes.

Means is also provided for reciprocally moving carriage 48 on rails 18 and 20. For that purpose, a drive yoke 54 is also mounted for sliding movement on rail 20. Yoke 54 comprises a front end piece 56 and a rear end piece 58 with an opening therebetween. Front end piece 56 is forward of support arm 50 of the carriage and rear piece 58 is forward of arm 52. A spring 60 is mounted between forward arm 50 of the carriage and the rear piece 58 of yoke 54. It will be apparent, therefore, that as yoke 54 moves towards hopper 22 motion will be imparted to the carriage through spring 60, which becomes slightly compressed. Notwithstanding, should carriage 48 be stopped, as by an obstruction, yoke 54 can continue forward to some degree, spring 60 being merely compressed to a greater extend. This mechanism provides a lost motion between the carriage and the yoke, so that the yoke may be advanced independently of the carriage. This allows the yoke to be used for operating control switches as when the carriage reaches the end of its operative travel, or if there is a malfunction that interferes with movement of the carriage.

Yoke 54 is driven by a stepping motor 62 mounted beneath frame 12. Yoke 54 connects to stepping motor 62 through a toothed belt or chain 64 and a chain clamp 66.

Referring to FIGS. 1 and 4, yoke 54 carries an actuating arm 68 which in turn supports a roller 72 mounted on a pin 70. Roller 72 is engageable with a cam surface 86 formed on a lever 84 that is secured to a shaft 82, which is itself mounted between a pair of arms 80 that extend forwardly of hopper 22. Shaft 82 also supports and connects with a bracket 87 comprising a door operating arm 88 and a pair of roller-supporting depending arms 90. Arm 88 cooperates with the roller mounted to a drawer lever 110 which forms a part of a standard duplicating-testing apparatus 108.

Arms 90 support rollers 93 that operate a slide 92 comprising a pair of spaced plates 92a, 92b and a back plate 92c. Slide 92 is supported on a pair of posts 95 which project from and are mounted to the forward side of front wall 24. A pair of helical springs 94 are disposed on posts 93 between front wall 24 and back plate 92c, and each spring 94 asserts a bias that tends to return slide 92 to the position shown in FIG. 6.

Arms 92a, 92b are supported at a level directly under the bottom edge of front wall 24 and directly above front plate 42. Thus, arms 92a, 92b are positioned to engage the leading edge of the diskette that is directly supported upon plate 42. The contact surfaces of arms 92a, 92b are dished or formed with a concave surface 96 to enhance separation of the lowermost diskette from other diskettes in the stack, as shown in FIG. 7.

Referring back to the carriage assembly, disk clamp 98 is pivotally mounted upon a shaft 100 to plate 49. The clamp is generally wedge shaped, tapering to a relatively sharp front end 102, as shown in FIG. 5. A relatively flat and vertical surface 105 is formed slightly back from the front of the clamp. The clamp is pivotally moved relative to an anvil 106 by means of solenoid 104.

The overall operation of this machine will now be explained, particularly with reference to FIGS. 5–9:

FIG. 5 illustrates a position of the carriage and clamping mechanism at the start of an operation. The lowermost disk in bin 22, shown in phantom and designated by the reference 112, is positioned such that the end flap 39 protrudes from under back walls 28. This condition may be established manually and it is a natural position of the lowermost diskette after each full cycle of machine operation. All of the diskettes supported above lower diskette 112 rest upon front plate 42 and their open flaps are positioned forwardly of rear side walls 28.

Now, with reference FIG. 6, the carriage is advanced toward hopper 22 to position clamp 98 over the flap 39; then solenoid 104 is actuated to grip the flap between the clamp and anvil 106. Carriage 48 is again advanced, moving the lowermost diskette beneath plate 42. As this is done, the leading edge of the diskette contacts deflecting plates 45, which direct the leading edge toward the door of duplicating-testing machine 108. As the carriage continues to move forward, roller 72 contacts cam surface 86, rotating shaft 82, pivoting arm 88 and moving door opening lever 110 downward. Continued advancement of the carriage and its supported clamping mechanism fully inserts the diskette into machine 108.

The rotation of shaft 82 simultaneously pivots arms 90, forcing slide 92 to move against springs 94. The dished or concave surfaces 96 engage the lowermost diskette supported on front plate 42 and, as slide 92 moves to the left (as shown in FIGS. 6 and 7), the diskette is moved to the left until it falls from front plate 42 onto side plates 43 and 46. The diskette is now positioned—as was the first diskette—with its open flap protruding in front of rear walls 28.

After fully inserting diskette 116 into machine 108, the machine performs its duplicating-testing functions and then returns the diskette through its open door to be regripped between lever 98 and anvil 106. The diskette is now transported beneath hopper 22, as shown in FIG. 8 and, depending upon the condition of testing, the diskette is deposited into one of two bins 120 or 122. The carriage is then returned to its home or start position. The sequence of operation is continued until all diskettes within hopper 22 have been duplicated and tested.

It will be understood that those diskettes that prove to be bad can be removed from their envelopes and the envelopes salvaged.

Although the appartus and its operation have been described in connection with an open flap diskette, the same sequence of operations may be carried out using diskettes that are sealed in their envelopes. This is accomplished simply by relocating the clamping mechanism to a more forward position relative to hopper 22. In that regard, screws 51 are loosened and the position of plate 49 is adjusted forwardly on carriage 48. Now the apparatus is set up to grip the edge of the lowermost diskette rather than an extended flap. The operation of the machine, however, is the same.

Although a specific embodiment of the present invention has been illustrated and described, many variations can be made without departing from the spirit and scope of this invention, and each of such variations is contemplated.

We claim:

1. In combination with a hopper for receiving a plurality of diskettes in stacked relationship, said hopper having front and rear containment walls, means for supporting a stack of diskettes in said hopper including first, second and third support means, each support means having a support surface, said first support means being located at the front of said hopper and having a support surface set below the front containment wall to define a front slot therebetween, said second support means being located at the rear of said hopper and having a support surface set below the rear containment walls to define a rear slot for receiving the edge of a diskette therethrough, the support surface of said third support means being located below and extending to the rear of the support surface of said first support means;

means aligned with said front slot for engaging and rearwardly pushing the bottom diskette from beneath said stack through said rear slot until the front edge of said diskette falls from the support surface of said first support means onto the support surface of said third support means;

and a diskette transport mechanism for transporting a diskette supported upon said second and third support means to a work station, said mechanism including a clamp for engaging a diskette supported on the support surfaces of said second and third support means, and means for moving said clamp to transport the lowermost diskette beneath said first support means to a work station.

2. The apparatus of claim 1 wherein said clamp is adjustably mounted on a carriage, said carriage being mounted upon a pair of rails, said clamp being adjustably mounted for operation at either one of two positions, a first position for engaging an open flap diskette and a second position for engaging a closed flap diskette.

3. The apparatus of claim 1, said means for engaging and rearwardly pushing the bottom diskette from beneath said stack being actuated as a diskette is moved into the work station by said diskette transport mechanism.

4. The apparatus of claim 1, said means for engaging and rearwardly pushing the bottom diskette comprising a slide reciprocally mounted in front of said hopper, means biasing said slide to a position forward of said hopper and retracted from the lowermost diskette supported on the support surface of said first support means, and means for moving said slide against said means biasing said slide as said diskette transport mechanism deposits a diskette to the work station.

5. The apparatus of claim 1, and means projecting forwardly and downwardly from the front of said hopper for deflecting a diskette supported upon said third support means and carried by said diskette transport mechanism to a work station.

6. The apparatus of claim 1, said diskette transport mechanism including means for actuating said clamp to engage each diskette at the work station, transport the diskette to one of two or more bins, and deposit the diskette into a selected bin.

* * * * *